US010052900B2

(12) United States Patent
Kamijo et al.

(10) Patent No.: US 10,052,900 B2
(45) Date of Patent: *Aug. 21, 2018

(54) PRINTING AND EXTRACTION OF 2D BARCODE ON 3D OBJECTS

(71) Applicant: INTERNATIONAL BUSINESS MACHINES CORPORATION, Armonk, NY (US)

(72) Inventors: Koichi Kamijo, Kanagawa-ken (JP); Masaharu Sakamoto, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,723

(22) Filed: May 2, 2017

(65) Prior Publication Data

US 2017/0232773 A1 Aug. 17, 2017

Related U.S. Application Data

(63) Continuation of application No. 14/825,555, filed on Aug. 13, 2015, now Pat. No. 9,659,202.

(51) Int. Cl.
| *G06F 19/00* | (2018.01) |
| *B41M 3/14* | (2006.01) |
| *G06K 7/14* | (2006.01) |
| *G06K 1/12* | (2006.01) |
| *G06K 7/12* | (2006.01) |
| *G06K 7/10* | (2006.01) |

(52) U.S. Cl.
CPC ............. *B41M 3/14* (2013.01); *G06K 1/121* (2013.01); *G06K 7/10* (2013.01); *G06K 7/12* (2013.01); *G06K 7/1417* (2013.01); *G06K 7/1491* (2013.01)

(58) Field of Classification Search
CPC ........ G06Q 10/087; G06Q 10/08; G06K 7/14; G06K 7/1417; G06K 7/1491
USPC ................................ 235/462.1, 462.12, 385
See application file for complete search history.

(56) References Cited

U.S. PATENT DOCUMENTS

| 9,659,202 B2* | 5/2017 | Kamijo ................ G06K 7/1417 |
| 2003/0047612 A1* | 3/2003 | Shaked ..................... G06K 7/14 |
| | | 235/462.1 |

FOREIGN PATENT DOCUMENTS

| JP | 2001266092 A | 9/2001 |
| JP | 2002036763 A | 2/2002 |
| JP | 2008186487 A | 8/2008 |
| JP | 5310188 B | 10/2010 |
| JP | 2011054211 A | 3/2011 |

OTHER PUBLICATIONS

List of IBM Patents or Patent Applications Treated as Related dated May 2, 2017, 2 pages.

* cited by examiner

*Primary Examiner* — Karl D Frech
(74) *Attorney, Agent, or Firm* — Tutunjian & Bitetto, P.C.; Vazken Alexanian

(57) ABSTRACT

A method for printing and extracting of a barcode for an object includes dividing a barcode into disjointed regions and assigning the disjointed regions to different locations on an object. The disjointed regions are printed on the object at the different locations wherein the disjointed regions are printed visibly or invisibly.

20 Claims, 9 Drawing Sheets

PRINTING AND EXTRACTION OF 2D BARCODE ON 3D OBJECTS

BACKGROUND

Technical Field

The present invention relates to barcoding objects, and more particularly to systems and methods for applying barcodes on three-dimensional objects even if its surface is not flat or does not have enough space to locate barcodes.

Description of the Related Art

Three-dimensional (3D) printing makes it possible to create various objects; however, rights management protection and traceability remain an issue for printed objects. Solutions to rights management protection need to be permanently affixed to the printed objects. In one instance, integrated modeling may be performed to a surface of the 3D object which includes its rights management and traceability information as a 2D barcode. However, this requires the surface of the 3D object to be flat or gently curved. It may be possible to map the barcode onto the surface by using 3D mapping technology, but this requires a sufficient area to which the code is mapped. In addition, having a barcode printed on the object can detract from the beauty or appearance of the object.

SUMMARY

A method for printing and extracting of a barcode for an object includes dividing a barcode into disjointed regions and assigning the disjointed regions to different locations on an object. The disjointed regions are printed on the object at the different locations wherein the disjointed regions are printed visibly or invisibly.

Another method for printing and extracting of barcodes for an object includes dividing a barcode into disjointed regions; simulating recombination of the disjointed regions of the bar code to ensure a unique recombination.

A non-transitory computer readable storage medium includes a computer readable program for printing and extracting of a barcode for an object, wherein the computer readable program when executed on a computer causes the computer to perform the steps of dividing a barcode into disjointed regions; assigning the disjointed regions to different locations on an object; and assigning the disjointed regions for printing on the object at the different locations wherein the disjointed regions are printed visibly or invisibly.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
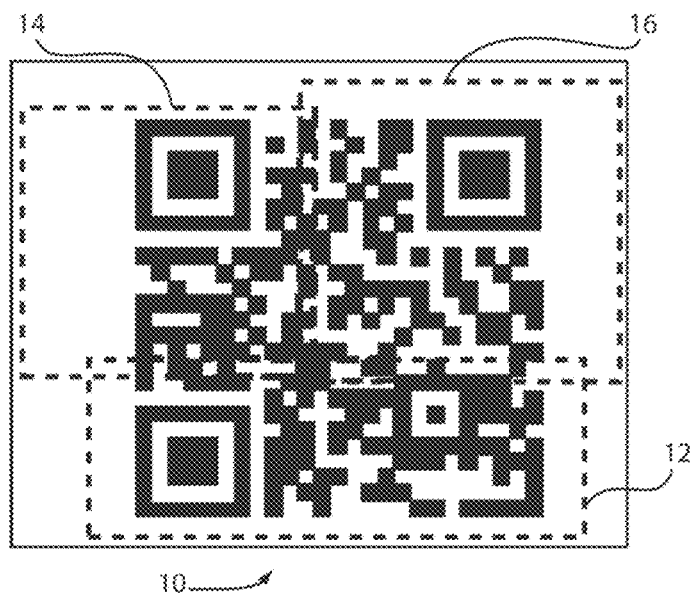
FIG. 1 is an illustrative quick response (QR) code shown being divided into three regions in accordance with the present principles.

In accordance with the present principles, systems and method are provided that employ permanent barcodes to 3D printed objects. While the present principles are illustratively directed to 3D printed objects, the present principles may be applied to bar coding of any 3D object. For ease of explanation, the 2D barcodes described herein will be illustratively represented as quick response (QR) codes; however it should be understood that any bar coding scheme may be employed. In accordance with useful embodiments, invisible barcodes may be applied to objects. This may include employing a technology to print barcodes using invisible ink, which can be read by illuminating the barcode with a deciphering device, such as, blacklight or camera capable of deciphering invisible markings. In accordance with such embodiments, a QR code can be printed/created without interfering with the beauty or appearance of the object. Embodiments employ invisible ink direction information to provide guidance for the proper placement of the blacklight because of the directivity needed to read/scan the barcode. In this way, the locations of the QR code can be easily known or determined using the proper placement and illumination of the blacklight.

The barcodes may be employed for rights management protection and tracing purposes, e.g., in a manufacturing cloud environment. The present principles permit integrated modeling of a 2D barcode on a 3D object, even if its surface is not flat or does not have enough space to create a square code. The printed 2D barcode may be invisible (invisible ink) so that it does not interfere with the appearance of the object. For the invisible 2D barcode, a best location for applying a blacklight may be specified in invisible (or visible) ink to lead to the location where the barcode is printed.

In a useful embodiment, the barcode may be divided into pieces based on the shape of object where the barcode is to be created. Joints may be provided in each piece so that the pieces can be recombined. Visible and invisible barcodes may be employed and may be pieced together. Integrated modeling of the barcode may be provided with navigation information to indicate the location and/or assembly of each piece of the disjointed barcodes. The navigation information may also indicate a best location to illuminate invisible barcodes with the blacklight. In another embodiment, the navigation information may also be employed to help locate where the barcodes are located whether visible or invisible.

The barcode size and location may be decided based on consideration of a number of colors that can be used to print invisible barcode. For example, if a total number of printer heads is n and m heads are used for visible ink, a number of colors that can be used for invisible ink is n-m, where n≥m>0. The size of the cells of the barcode needs to be equal to or larger than a smallest size that can be deciphered by a digital camera that is employed to take a picture of the barcode, e.g., a size such that some cells may not be able to be recognized by some cameras if the cell is created smaller. In case the 3D printer has single-head, QR code can be created by unevenness of the surface of the object. Disjointed QR code (pieces) can be applied for this case as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that the present invention will be described in terms of a given illustrative architecture; however, other architectures, structures, substrate materials and process features and steps may be varied within the scope of the present invention.

It will also be understood that when an element such as a layer, region, substrate, etc. is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, a 2D barcode 10 is shown in accordance with one embodiment. The 2D barcode 10 may include a QR code or any other suitable barcode for identifying a part, object, product, etc. The barcode 10 includes dark and light portions that may be printed in invisible or visible ink in accordance with the present principles. In addition, all or portions of the barcode 10 may be in relief or incorporated into the three dimensional shape of an object. In accordance with the present principles, the barcode 10 may be divided (disjointed) into a plurality regions 12, 14, 16. While three regions 12, 14, 16 are depicted in FIG. 1, any number of regions may be employed. The regions 12, 14, 16 are determined and make up the whole barcode 10. The regions 12, 14, 16 can be rendered in ink (visible or invisible) or in relief on an object to be identified.

The regions 12, 14, 16 need not overlap although they may in some embodiments, especially if redundant information is needed due to placement of conditions on the object. The disjointed barcode 10 with both visible and invisible barcode regions may be separated and regions 12, 14, 16 placed in different portions of an object. The division of the regions 12, 14, 16 may be performed in accordance with a shape of the object and a disjointing rule or policy. A cut side of the regions 12, 14, 16 (where the regions meet) is duplicated in both adjoining regions so that recombination may be performed at extraction. Once divisions for the regions 12, 14, 16 is determined, the regions 12, 14, 16 may be formed on or placed on the object.

When decomposing a QR code, each part or region is cut so that the part can be connected uniquely like a jigsaw puzzle. It is unnecessary to overlap the regions, but overlapping may be employed. The smallest unit of the regions is a cell. A recombine simulation can be performed to confirm the unique combination.

Figure 2:
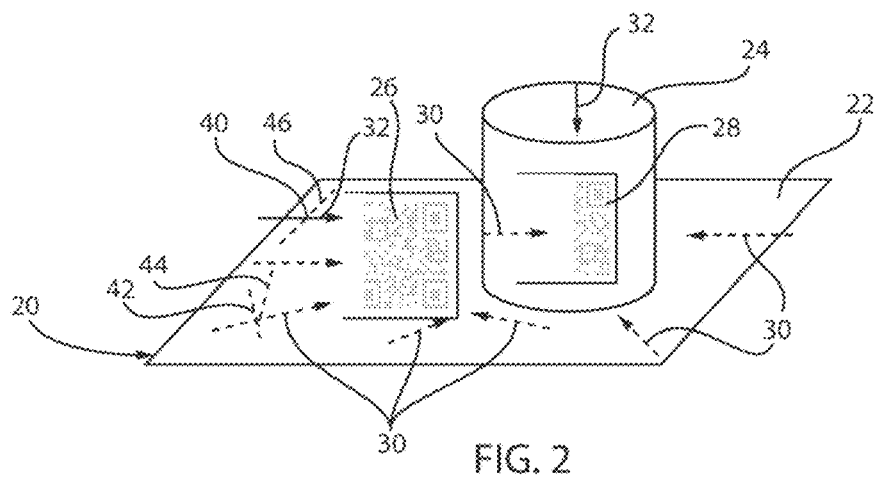
FIG. 2 is a perspective view of an object barcoded in accordance with the present principles.

Referring to FIG. 2, an object 20 includes two portions 22 and 24. Portion 22 includes a flat surface and portion 24 includes a round surface. The object 20 may include a 3D printed object or any other object. In this example, a barcode portion 26 is formed or placed on the flat portion 22 and a barcode portion 28 is formed or placed on the round portion 24. The barcode portions 26, 28 may both be visible, both be invisible or one can be visible and the other invisible. The selection of the visible/invisible barcode portions may be determined based on the object on which these barcode portion are placed. The disjointed regions may be assigned to different locations on the object but may be placed in a same area of the object, wherein the disjointed barcodes are printed visibly or invisibly.

In addition to the barcode portions 26, 28, a number of indexing features may be employed. The indexing features are optional and particularly useful for the case of invisible barcode, although the indexing features may be employed to assist in finding visible barcodes as well. The indexing features may include visible arrows 32 and/or invisible arrows 30. The indexing features may also include other features to indicate a number of barcode regions, orientation information or other information. The arrows 30, 32 may point to the position of the barcode portions 26, 28. This is particularly useful when the barcode portions 26, 28 are invisible.

Figure 3:
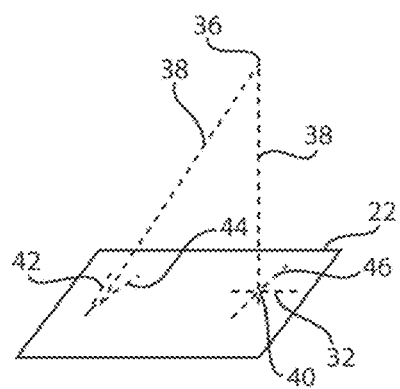
FIG. 3 is a perspective view of an object showing index markings that provide a device placement position for a deciphering device in accordance with the present principles.

Referring to FIG. 3 with continued reference to FIG. 2, indexing features are employed to provide a deciphering device (e.g., blacklight) illumination or reading position 36. The crossing 36 of two long dashed lines 38 indicates a recommended location where the deciphering device should be placed to visualize an invisible barcode. If the marks include a cross 40, a line 38 is stretched from the cross 40 perpendicular to a surface of the object 22. In other cases, using a longer line 42 as an axis, a short line 44 is rotated to stretch the rotated line to provide another direction (long dashed line 38), and the intersection 36 of these two lines 38 is the location to illuminate the blacklight. By adding arrows 30, 32 to some of the lines 42, 44, 46, the arrows 30, 32 can be employed to indicate the location of the disjoint barcodes as well. Different arrows and index conventions may also be employed.

Figure 4:
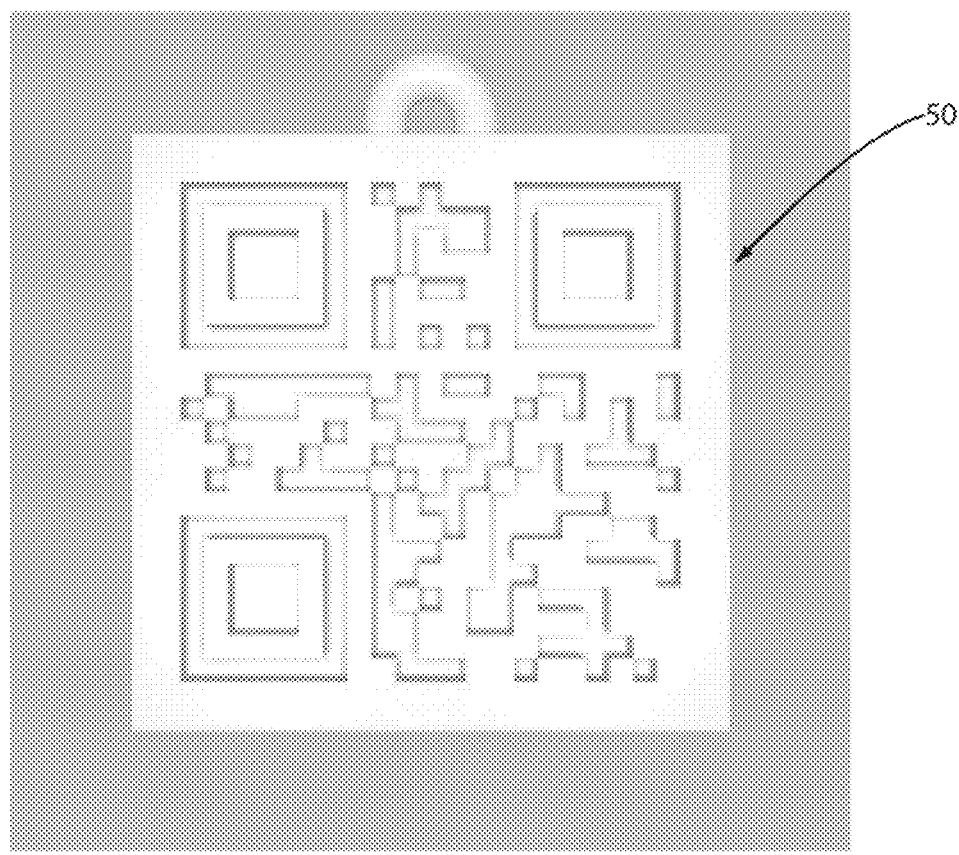
FIG. 4 is an illustrative example of QR code created using unevenness of a surface.

Referring to FIG. 4, a relief barcode 50 is illustratively shown. This type of barcode 50 may be printed (3D printing), molded or otherwise formed in a surface of the object. This type of barcode 50 is particularly useful for curved or uneven surfaces.

Figure 5:
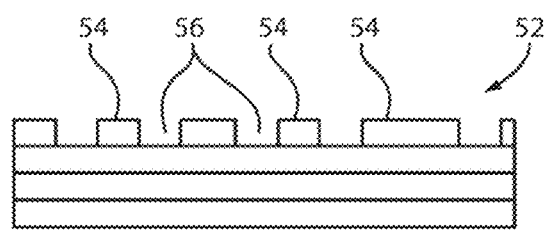
FIG. 5 is a cross-sectional view of a barcode printed with a single print head in accordance with the present principles.

Referring to FIG. 5, a code surface 52 defines a barcode in accordance with one embodiment. A single print head may be employed to generate raised portions 54 and trench portions 56.

Figure 6:
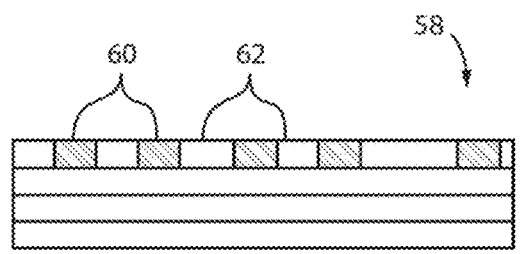
FIG. 6 is a cross-sectional view of a barcode printed in multiple colors (including invisible ink) with multiple print heads in accordance with the present principles.

Referring to FIG. 6, a code surface 58 defines a barcode in accordance with another embodiment. Multiple print heads may be employed to generate different colored portions 60 and 62 to provide the barcode. The colored portions may include visible or invisible ink.

Figure 7:
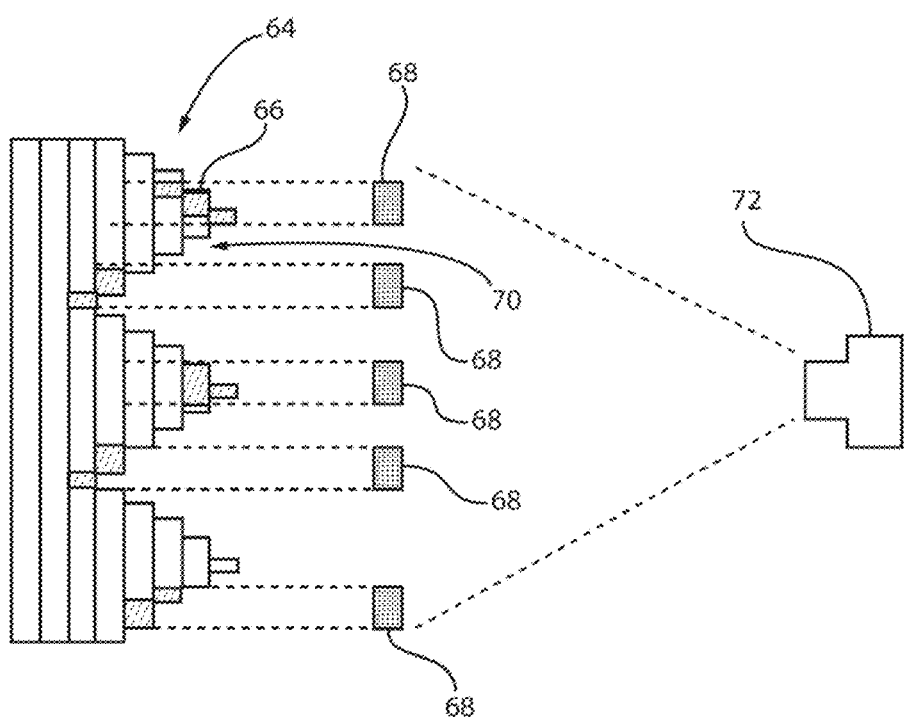
FIG. 7 is a cross-sectional view of an object having a barcode printed in relief thereon in accordance with the present principles.

Referring to FIG. 7, when no flat surface is available a code surface 64 may be defined on non-flat surfaces. 3D Printing machines employ the STL file format for input. An STL file describes a raw unstructured triangulated surface by a unit normal and vertices of triangles using a three-dimensional Cartesian coordinate system. A "flat" surface can be determined by testing the normal direction of adjacent triangles. When viewed by a camera 72, colored portions 66 provide a barcode pattern 68 on non-flat surfaces 70. Colored portions 66 may include visible or invisible ink or the barcode pattern may be printed into the surfaces 70.

Figure 8:
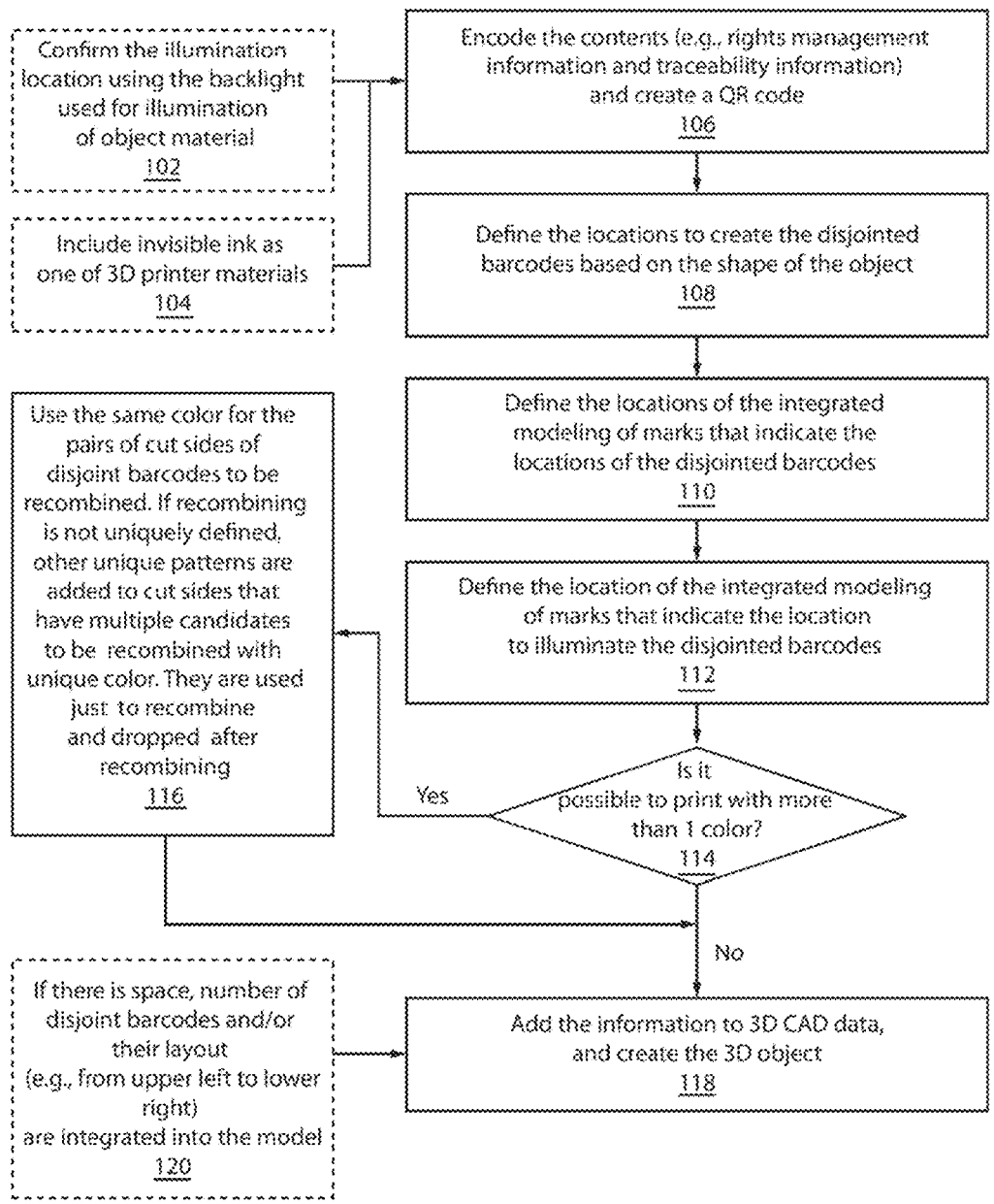
FIG. 8 is a block/flow diagram showing a method for integrating barcode portions, index markings, colors, etc. into a 3D printing model in accordance with the present principles.

Referring to FIG. 8, a method is described which creates a disjointed barcode for an object. In block 102, a backlight illumination position is determined for an object to be barcoded when invisible ink is employed. In block 104, depending on the object invisible ink may be included as one or more of the 3D printer materials. A decision on whether to make portions of the barcode (or the whole barcode) visible or invisible may also be made. In block 106, the contents of the object are encoded into a barcode. The content may include rights management information and/or traceability information. The barcode is generated. In block 108, locations are defined to create the disjointed barcodes based on the shape or other characteristics (textures, regions, etc.) of the object.

In block 110, locations of index markings (integrated modeling) may be defined that indicate locations of the disjointed barcodes if invisible or visibly ink is employed. In block 112, locations of index markings (integrated modeling) may be defined that indicate locations to illuminate the disjointed barcodes (and/or index markings) if invisible ink is employed. In block 114, a determination is made as to whether printing can be performed with more than one color. If yes, go to block 116. In block 116, use a same color for the pairs of cut sides (region edges) of disjoint barcodes to be recombined. If recombining is not uniquely defined, other unique patterns may be added to the cut sides that have multiple candidates to be recombined with a unique color. These unique patterns are employed just for recombination of the disjointed barcodes and dropped after recombining. Then, go to block 118.

If no, in block 114, go to block 118. In block 118, the location information, etc. is added to the computer aided design data (integrated into the model) for generating the object. In block 120, if there is space, the number of disjoint barcodes and/or their layout or orientation (e.g., from upper left to lower right) may be integrated into the model.

Figure 9:
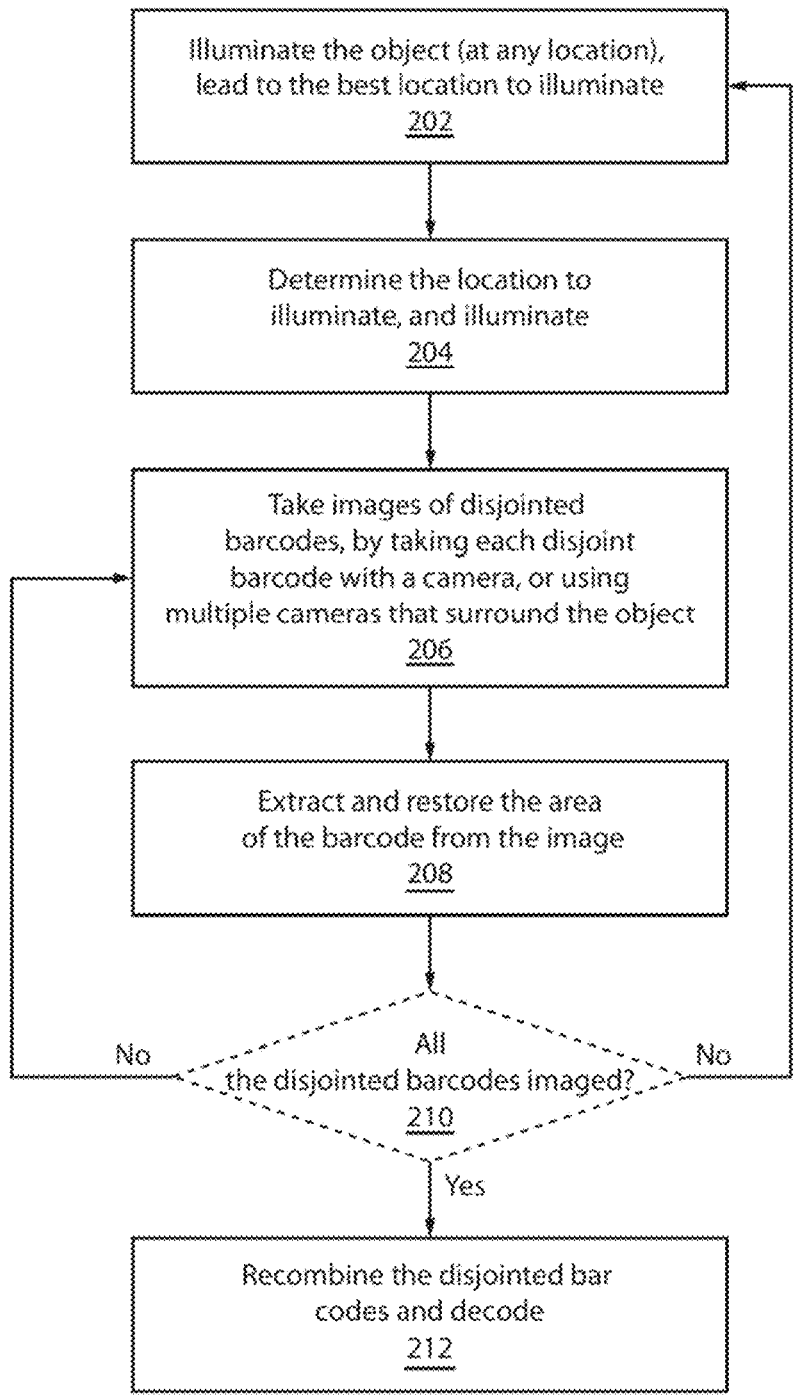
FIG. 9 is a block/flow diagram showing a method for reading a barcode and index markings from an object in accordance with the present principles.

Referring to FIG. 9, a method for reading a disjointed barcode on an object (e.g., a 3D printed object) is illustratively shown. In block 202, the object is illuminated (at any location) and lead to the best location using arrows or other indexing marks (visible or invisible ink may be used). In block 204, the best location to illuminate is determined, and the illumination is performed to reveal the barcode (and invisible index marks) if invisible ink is used. In block 206, images of the disjointed barcodes are collected by taking each disjointed barcode with a single camera or using multiple cameras that surround the object.

In block 208, the barcodes are extracted and restored (fixed if needed) from the images. This can be completed using clues in the barcodes (e.g., aligning common features or colors), using known information about the barcode assembly, etc. In block 210, a determination is made as to whether all barcodes have been obtained. If yes, the method goes to block 212 where the disjointed barcodes are recombined to decode the barcode. If no, in block 210, the path can be returned to block 206 to retake the images if invisible ink is not used or block 202 to find other disjointed barcodes if invisible ink is used.

Figure 10:
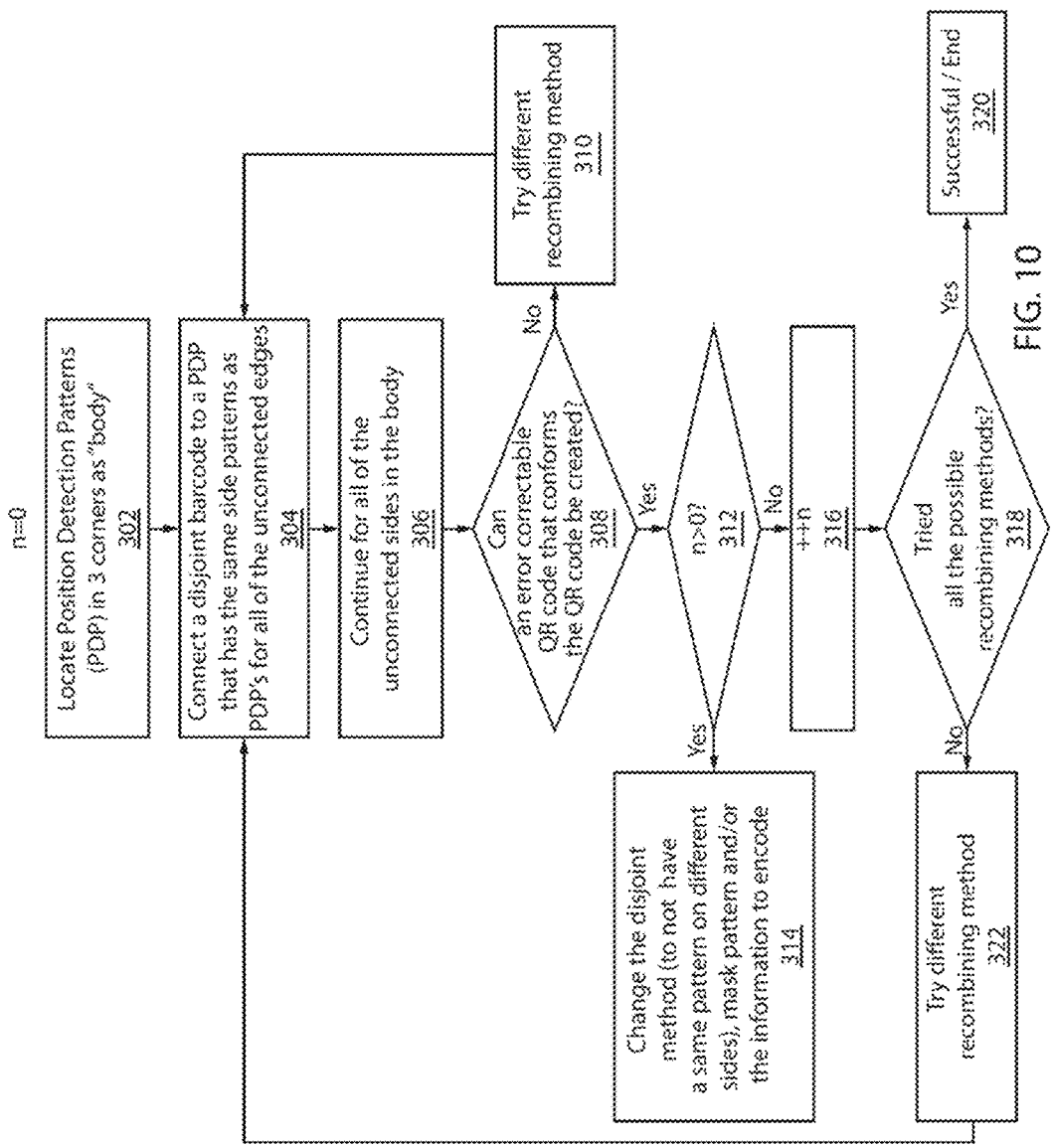
FIG. 10 is a block/flow diagram showing a method for simulating recombination of a barcode to test if a partitioning is unique in accordance with the present principles.
Figure 11:
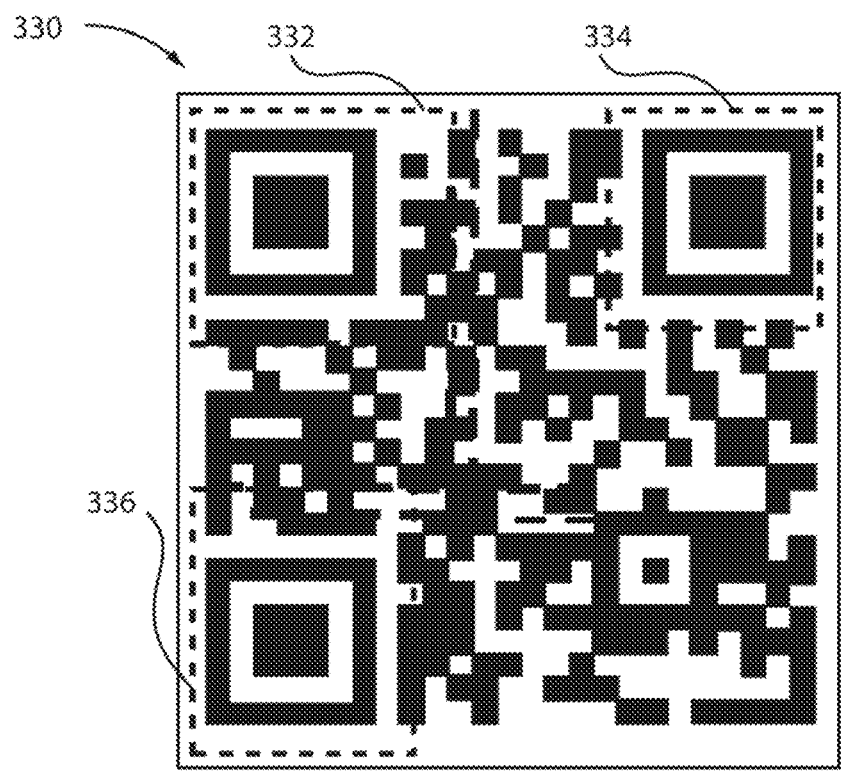
FIG. 11 is an illustrative QR code showing position detection patterns highlighted in accordance with the present principles.

Referring to FIG. 10, a recombining simulation method is illustratively shown in accordance with one embodiment to recombine disjointed barcodes. The simulation method is employed to test whether a barcode division is feasible. In block 302, position detection patterns (PDP) are located to define a body of the barcode. A disjoint rule may need to have each or the PDPs as a unitary cell. A counter n is set to zero. In FIG. 11, barcode 330 illustratively includes three PDPs regions 332, 334, 336.

In block 304, disjointed barcodes are connected to the PDP that has a same side pattern as the PDP for all of the unconnected edges. In block 306, the process continues to match the disjointed barcodes with the PDPs for all unconnected sides of the body. In block 308, a determination is made as to whether an error correctable QR code (or other code) can be provided that conforms to acceptable standards (e.g., ISO_IEC_18004). If no, block 310 tries a different recombining method going back to block 304. If yes, a check of the n counter is made in block 312.

If n is greater than 0, in block 314, the disjoint method may be changed. In case more than 2 QR codes that can be error-corrected can be recombined, a different QR code disjoint method may be used until only one QR code can be recombined. The disjoint regions may need to be changed.

In block 316, the n counter is incremented. In block 318, a determination is made as to whether all available recombining methods have been tried. If yes, the program ends in block 320. Otherwise, the method tries the next recombining method going back to block 304.

Figure 12:
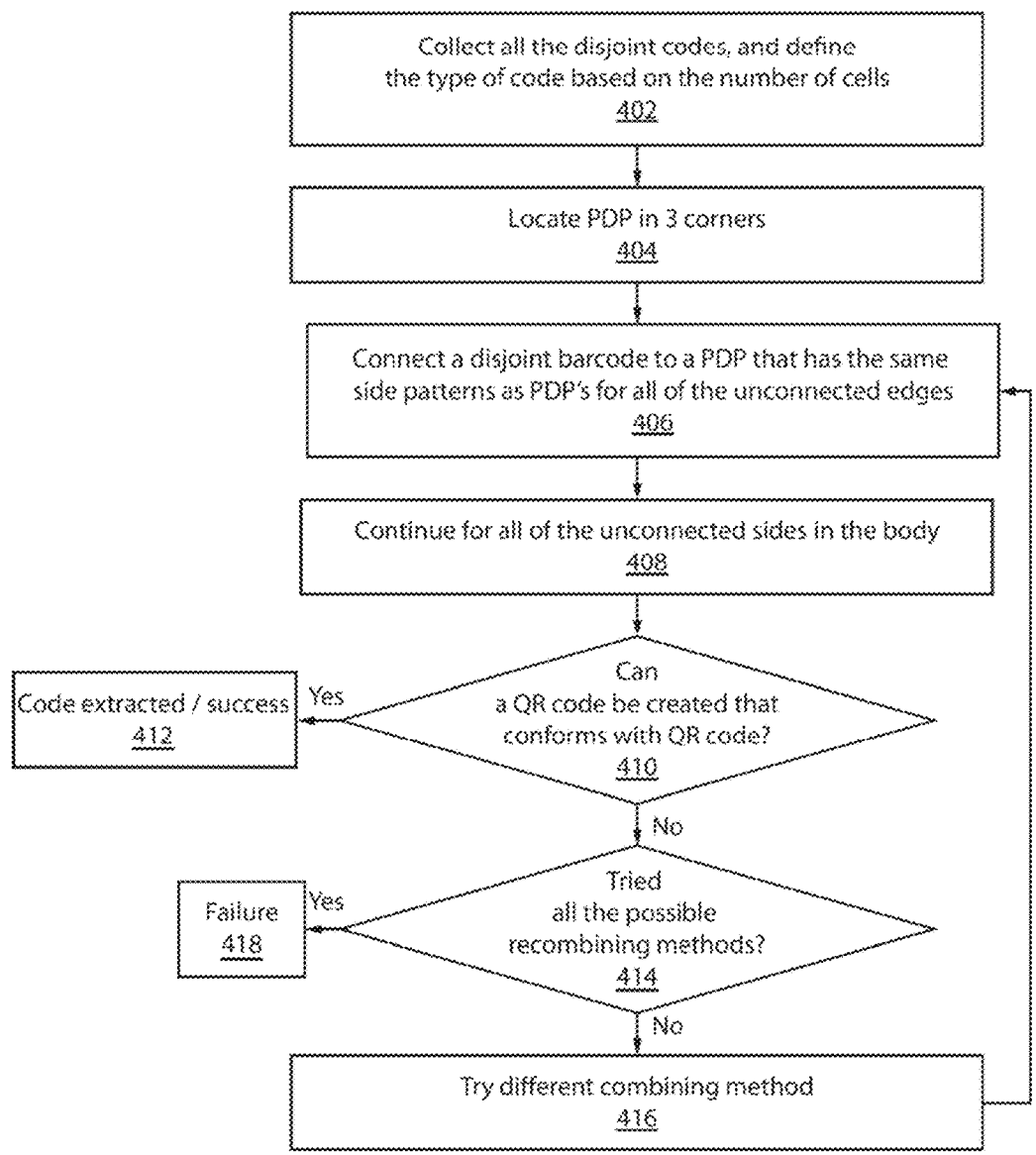
FIG. 12 is a block/flow diagram showing a method for recombination of a barcode in accordance with the present principles.

Referring to FIG. 12, a recombining method is shown in accordance with one illustrative embodiment. The recombining method may be run on both visible and invisible barcodes. In block 402, all disjointed codes are collected and a type of code is defined based on a number of cells in the code. In block 404, PDPs are located (three corners). In block 406, disjointed barcodes are connected to the PDPs with the same side patterns for all unconnected edges. In block 408, the process of block 406 is continued until the barcode is assembled. In block 410 a determination is made as to whether the code can be decoded (conforms to acceptable standards, e.g., ISO_IEC_18004). If yes, the code is extracted in block 412. Otherwise, in block 414, a determination is made as to whether all recombining methods have been tried. If yes, then a failure is flagged in block 418. Otherwise, a different recombining method is tried and processing continues, going back to block 406.

In accordance with the present principles, a number of processes may be employed to generate barcodes on 3D objects or during 3D printing. Examples include the following. Binder jetting may be employed where a liquid bonding agent is selectively deposited to bond powder materials. Directed energy deposition includes the application of thermal energy to fuse materials by melting them as they are being deposited. Material extrusion selectively extrudes material through a nozzle or orifice. Material jetting employs droplets of a build material, such as wax or a photopolymer, which are selectively deposited. Powder bed fusion also employs thermal energy to selectively fuse regions in a powder bed. Sheet lamination employs sheets of material that are bonded to form an object. Vat photopolymerization includes a vat filled with a photopolymer, and then light beams are employed to cross-link polymer chains. Binder jetting, material extrusion and material jetting may employ multiple printer heads and can employ invisible-ink.

While the present principles are described with respect to rights management of 3D objects (integrated modeling of product IDs) and traceability management, the present embodiments may be employed in numerous industries and have other uses.

Figure 13:
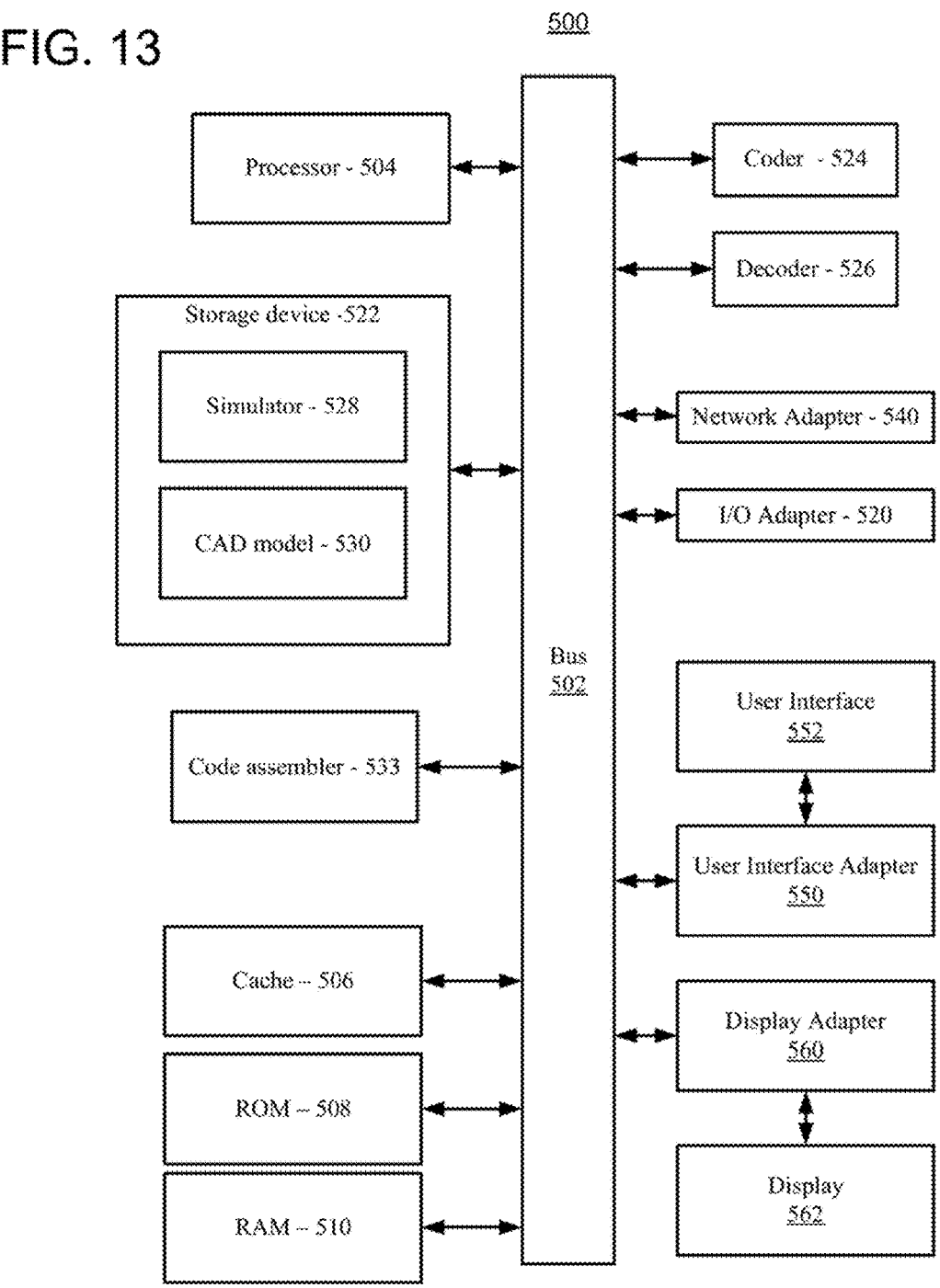
FIG. 13 is a block/flow diagram showing a processing system for creating and reading disjointed bar codes in accordance with the present principles.

Referring to FIG. 13, a block/flow diagram shows an exemplary processing system 500 for program optimization. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a network adapter 540, a user interface adapter 550 and a display adapter 560 are operatively coupled to the system bus 502.

A user input device 552 may be operatively coupled to system bus 502 by the user interface adapter 550. The user input device(s) 552 can be any of a keyboard, a mouse, a scanner, a barcode scanner, a keypad, an image capture device, a motion sensing device, a microphone, a device incorporating the functionality of at least two of the preceding devices, and so forth. Other types of input devices can also be employed, e.g., a touch screen display. The user input device 552 is employed to input and output information to and from system 500. A display 562 is coupled to the display adapter 560.

A storage device 522 is operatively coupled to system bus 502 (and may be coupled directly or through the I/O adapter 520). The storage device 522 can be any of a disk storage device (e.g., a magnetic or optical disk storage device), a solid state magnetic device, etc. The storage device 522 stores one or more programs that may be run on the system 500.

System 500 is configured to generate, simulate or read disjointed barcodes as described above with reference to FIGS. 1-12. In one embodiment, the system 500 creates and tests barcodes for integration on a part. In other embodiments, the system 500 is employed as a disjointed bar code reader. Other uses for system 500 are also contemplated.

In particularly useful embodiments, a coder 524 may be provided to generate a barcode, which may be submitted to a code assembler/disassembler 533 to generate a disjointed barcode. The assembler/disassembler 533 may be separate devices, e.g., a code assembler and a code disassembler. The disjointed barcode may be tested using a simulator 528 stored in memory of the storage device 522. The simulator 528 determines the uniqueness of the disjointed barcode and returns whether the barcode meets requirements. If not, modifications are made, or a new barcode is generated. Once the barcode is determined, it may be stored in a CAD model 530 used for 3D printing or other applications.

In another embodiment, the system 500 scans and assembles disjointed barcodes. A scanner or camera (e.g., as a user interface 552 or connected to the I/O adapter 520) is employed to collect images or scans of the disjointed barcode. The scanner or camera (552) may be employed with a blacklight or other deciphering device to enable reading of visible or invisible disjointed barcodes. The images are sent to the code assembler/disassembler 533 to be pieced together. The restored bar code is then decoded using the decoder 526.

The processing system 500 may include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

Having described preferred embodiments for printing and extraction of 2D barcode on 3D objects (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for printing and extracting of a barcode for an object, comprising;
    assigning regions of a divided barcode to different locations on an object; and
    printing the regions on the object at the different locations wherein the regions are printed visibly or invisibly.

2. The method as recited in claim 1, further comprising if invisibly printed, reading invisible regions off of the object by positioning a deciphering device in accordance with at least one index mark.

3. The method as recited in claim 2, wherein the at least one index mark is invisible and rendered visible by the deciphering device.

4. The method as recited in claim 2, wherein the at least one index mark includes at least one of arrows, lines or shapes to indicate locations of the regions and/or positions for employing the deciphering device.

5. The method as recited in claim 1, further comprising recombining the regions to decode the barcode.

6. The method as recited in claim 1, wherein the barcode is distributed in relief over a three-dimensional portion of the object.

7. The method as recited in claim 1, wherein the object and the barcode are three-dimensionally printed.

8. A method for printing and extracting of barcodes for an object, comprising;
- defining locations for applying disjointed regions of a divided barcode to different locations on an object, wherein one or more of the disjointed regions is rendered invisibly to provide an invisible barcode portion;
- defining locations for applying index markings to different locations on the object for locating the disjointed regions; and
- adding location information for the barcode and the index markings to a computer model for three-dimensional printing of the object with the barcodes and index markings.

9. The method as recited in claim 8, wherein the index markings provide guidance for positioning a deciphering device to decipher the invisible barcode portion.

10. The method as recited in claim 8, further comprising recombining the disjointed regions to decode the barcode portion.

11. The method as recited in claim 8, wherein the index markings include one or more invisible markings, which are rendered visible by a deciphering device.

12. The method as recited in claim 8, wherein the index markings include one or more of arrows, lines or shapes to indicate locations of the disjointed regions and/or positions for employing a deciphering device for invisible disjointed barcodes.

13. The method as recited in claim 8, wherein the barcode is distributed in relief over a three-dimensional portion of the object.

14. The method as recited in claim 8, wherein the barcode is three-dimensionally printed on or in a curved surface.

15. A non-transitory computer readable storage medium comprising a computer readable program for printing and extracting of a barcode for an object, wherein the computer readable program when executed on a computer causes the computer to perform the steps of:
- assigning regions of a divided barcode to different locations on an object; and
- assigning the regions for printing on the object at the different locations wherein the regions are printed visibly or invisibly.

16. The non-transitory computer readable storage medium as recited in claim 15, further comprising if invisibly printed, reading invisible regions off of the object by positioning a deciphering device in accordance with at least one index mark.

17. The non-transitory computer readable storage medium as recited in claim 16, wherein the at least one index mark is invisible and rendered visible by the deciphering device.

18. The non-transitory computer readable storage medium as recited in claim 16, wherein the at least one index mark includes at least one of arrows, lines or shapes to indicate locations of the regions and/or positions for employing the deciphering device.

19. The non-transitory computer readable storage medium as recited in claim 15, further comprising recombining the regions to decode the barcode.

20. The non-transitory computer readable storage medium as recited in claim 15, wherein the object and the barcode are stored in a model for three-dimensional printing.

* * * * *